Oct. 21, 1958 P. E. HAGGERTY ET AL 2,857,510
CONTAINER SUITABLE FOR DROPPING FROM AIRCRAFT
Filed Feb. 29, 1952 7 Sheets-Sheet 1
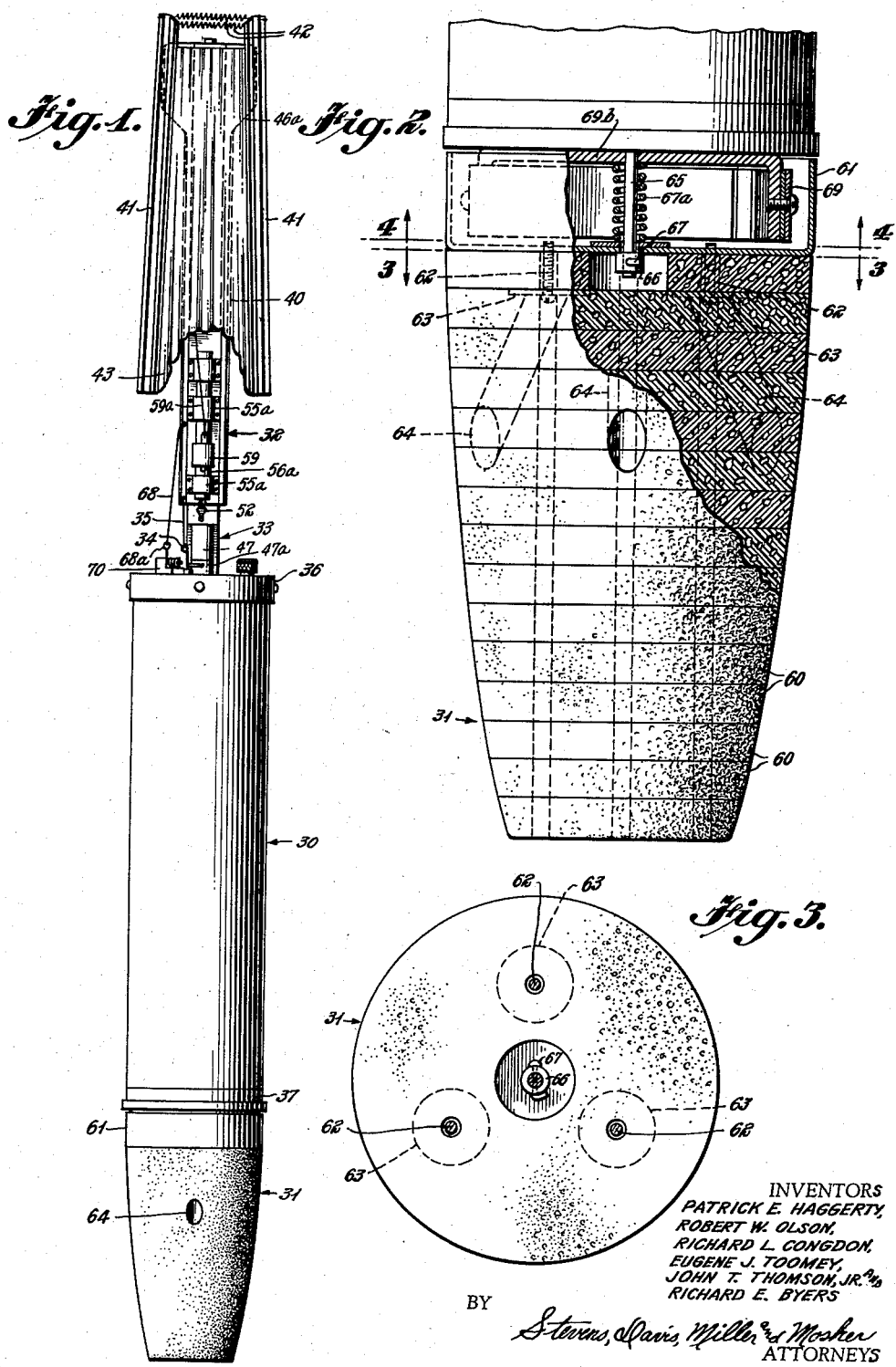
INVENTORS
PATRICK E. HAGGERTY,
ROBERT W. OLSON,
RICHARD L. CONGDON,
EUGENE J. TOOMEY,
JOHN T. THOMSON, JR. and
RICHARD E. BYERS
BY
Stevens, Davis, Miller & Mosher
ATTORNEYS

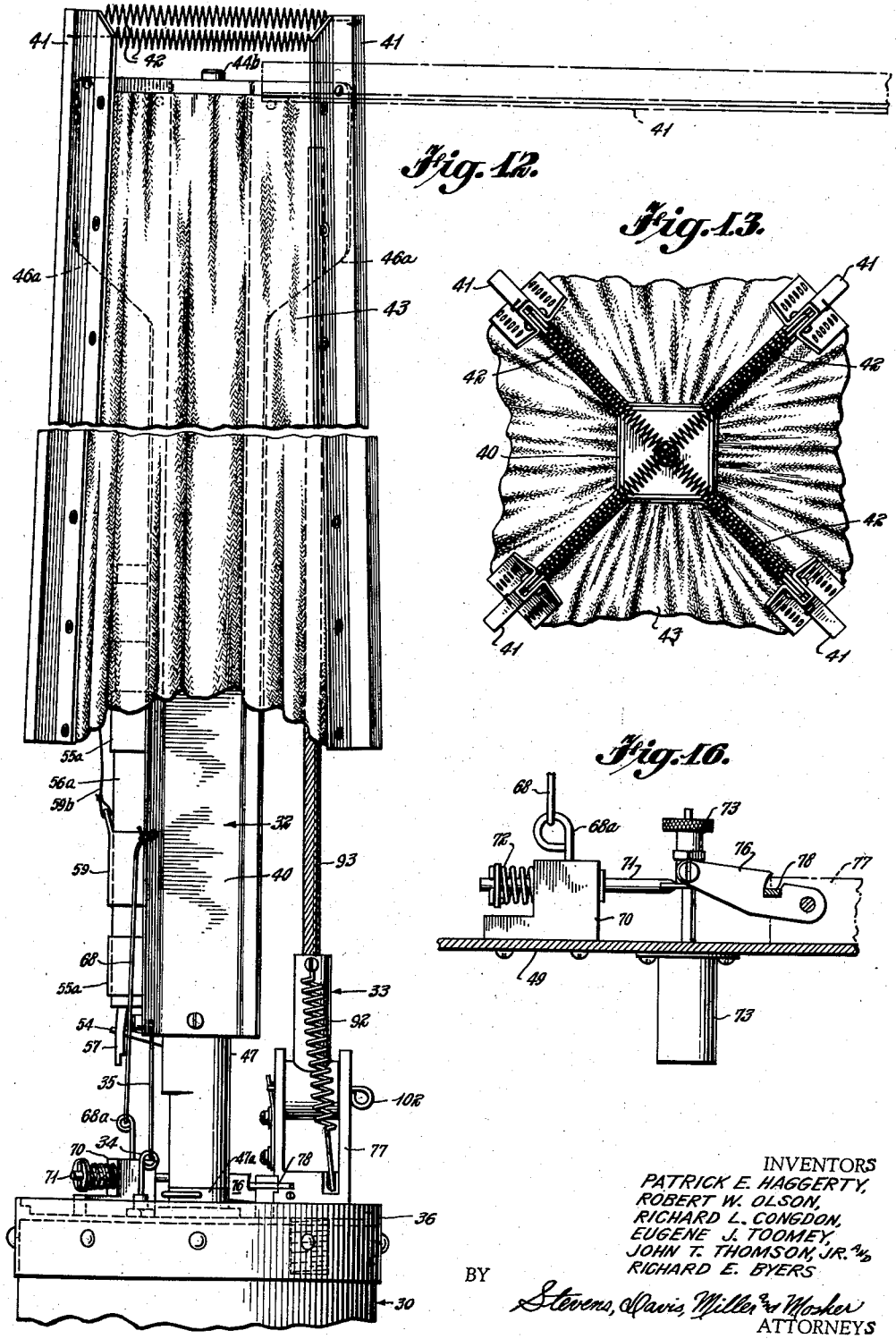

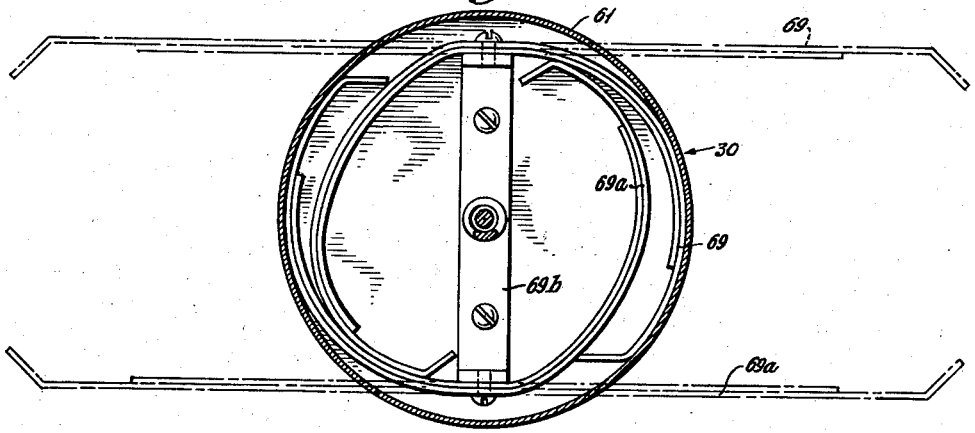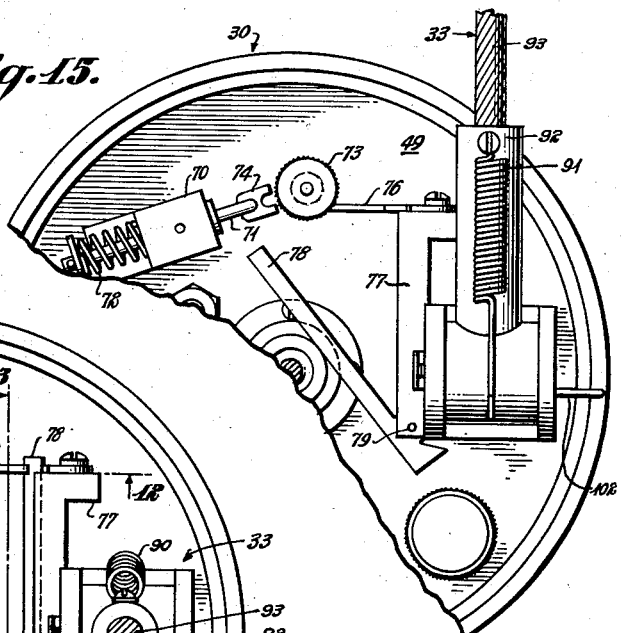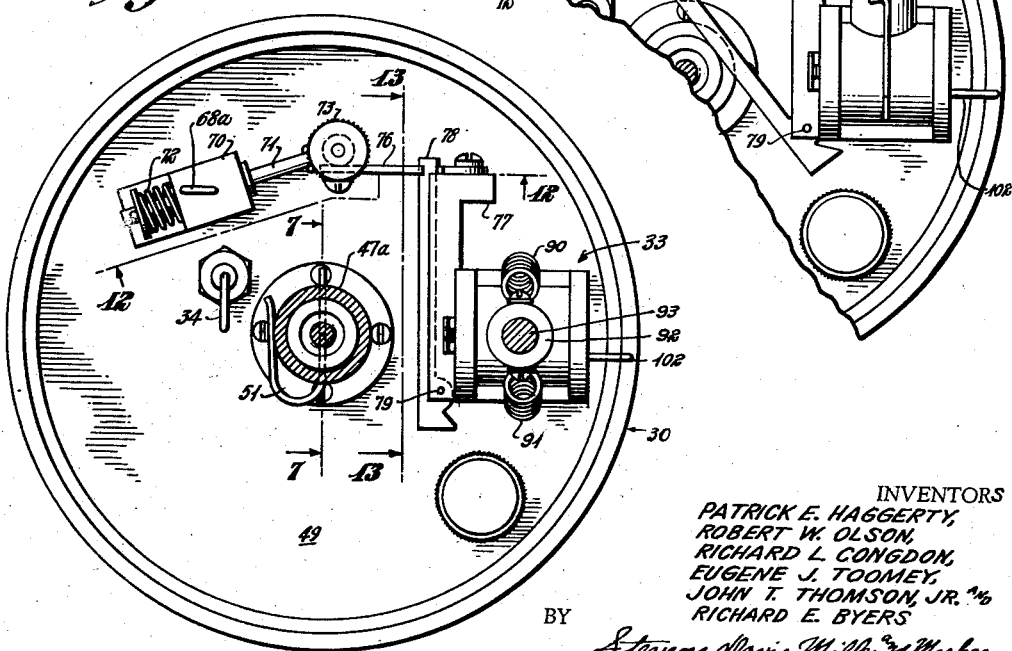

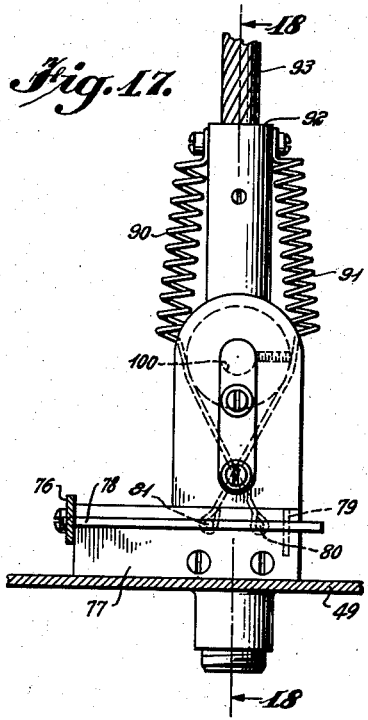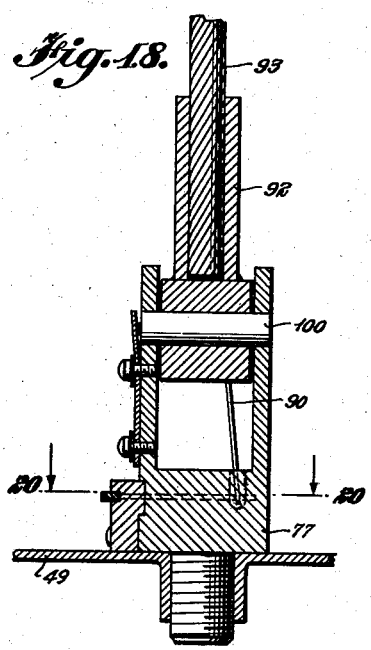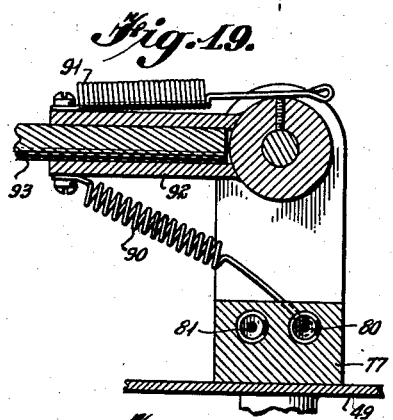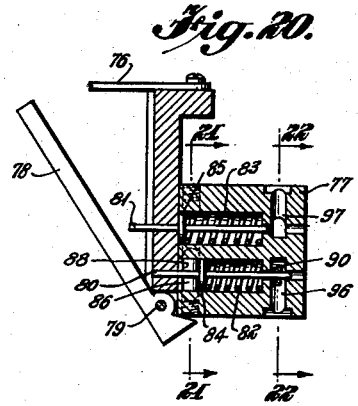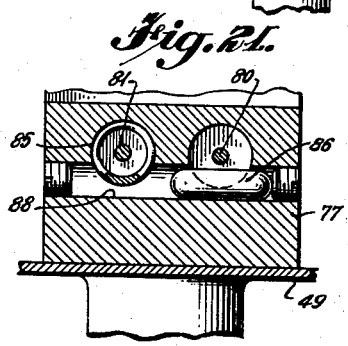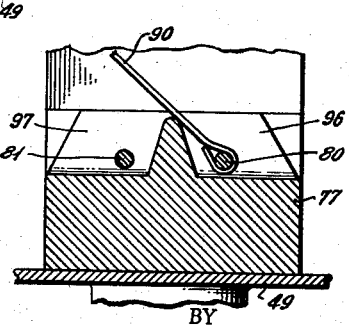

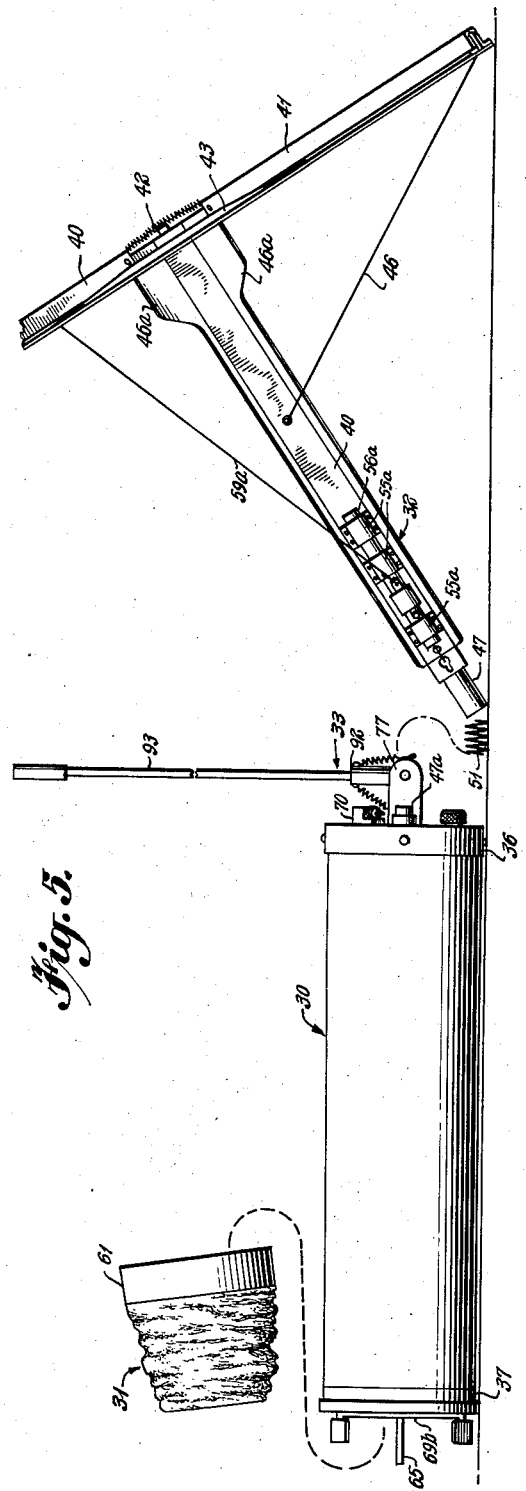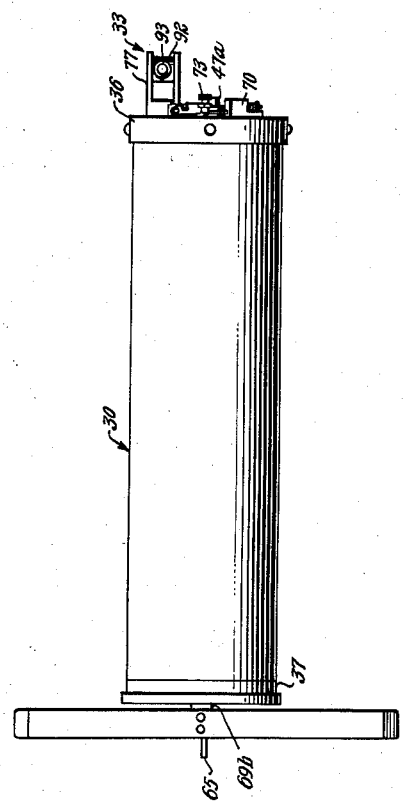

Oct. 21, 1958 P. E. HAGGERTY ET AL 2,857,510
CONTAINER SUITABLE FOR DROPPING FROM AIRCRAFT
Filed Feb. 29, 1952 7 Sheets-Sheet 6
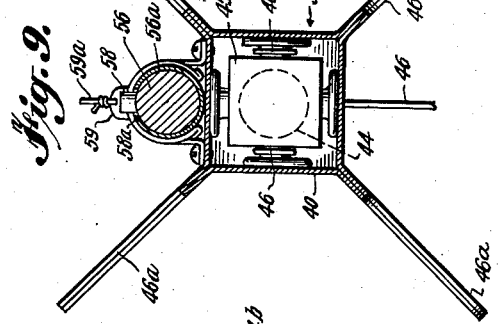
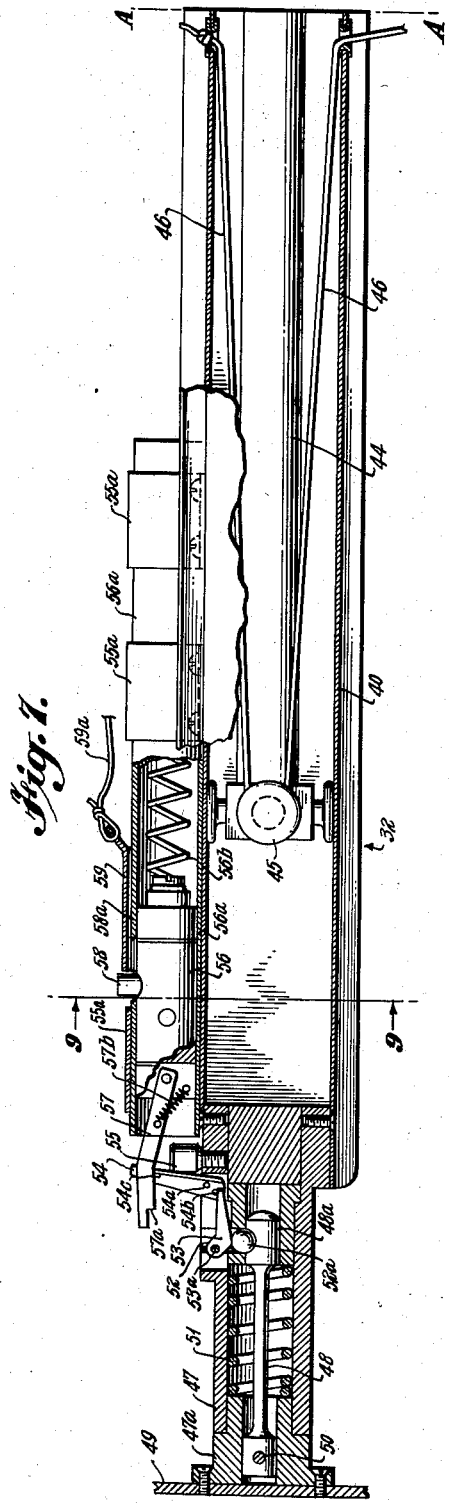
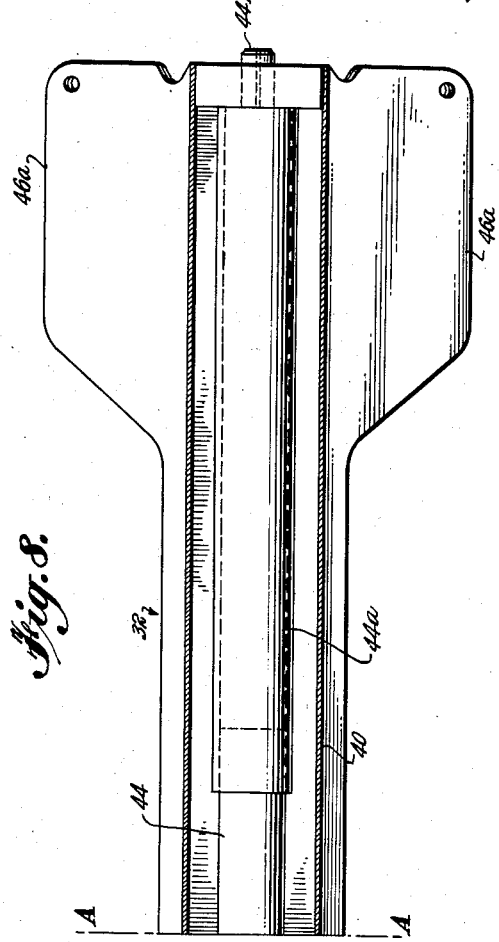
INVENTORS
PATRICK E. HAGGERTY,
ROBERT W. OLSON,
RICHARD L. CONGDON,
EUGENE J. TOOMEY,
JOHN T. THOMSON, JR. AND
RICHARD E. BYERS
BY
Stevens, Davis, Miller and Mosher
ATTORNEYS

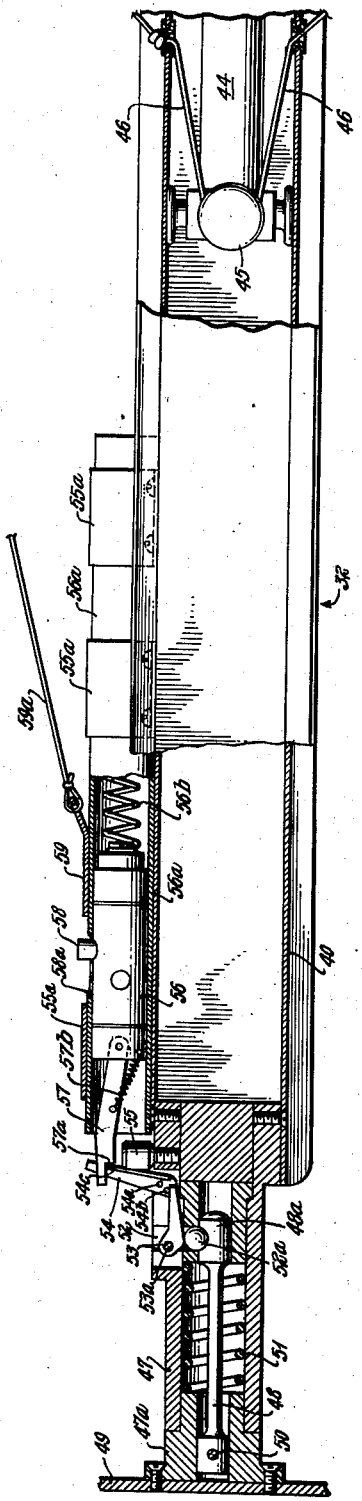

United States Patent Office 2,857,510
Patented Oct. 21, 1958

2,857,510

CONTAINER SUITABLE FOR DROPPING FROM AIRCRAFT

Patrick E. Haggerty, Robert W. Olson, Richard L. Congdon, Eugene J. Toomey, John T. Thomson, Jr., and Richard E. Byers, Dallas, Tex., assignors to Texas Instruments Inc., Dallas, Tex., a corporation of Delaware Application February 29, 1952, Serial No. 274,158

12 Claims. (Cl. 250—17)

This invention relates to container suitable for dropping from aircraft or the like and particularly to containers that will safely lower to the earth, by dropping, such delicate objects as scientific instruments and the like.

Prior to this invention, the problem of making scientific measurements in dangerous or inaccessible locations has often been considered and it has been suggested that a combination of a scientific instrument and a radio transmitter be dropped from an airplane, and that the results of the measurements made by the instrument can be transmitted back to the airplane or to some other point of observation, by the radio transmitter.

The difficulty with this suggestion, up to the present time, has been that the instruments have been too delicate to drop, and therefore had to be parachuted, which could not be done with sufficient accuracy and was unsatisfactory under military conditions because it attracted too much attention. Furthermore, some difficulty has been encountered in obtaining a satisfactory signal from the small radio transmitter and poor antenna system that it was heretofore necessary to use.

According to the present invention, there has been devised a droppable container that to a large extent overcomes these difficulties.

In its broadest aspect the present invention comprises the use of substantially non-resilient, crushable material to absorb the power of the impact, when the container strikes the earth. This is preferably a porous material such as the unoriented multi-cellular form of cellulose acetate known as "Strux" and manufactured by Aircraft Specialties Company, Inc., Hicksville, New York, under license from E. I. du Pont de Nemours and Co. This product is made in three densities, 4–5 lb./cu. ft., 5–6 lb./cu. ft., and 7–8 lb./cu. ft. All are satisfactory for the present purpose but the medium weight is preferred. However, it is apparent that other generally similar material can be used, although perhaps less desirably.

Sponge rubber, for example, is generally unsatisfactory for this purpose because it is resilient and lacks sufficient strength to absorb the power of the impact. Hard sponge rubber will work, although somewhat less satisfactorily than cellular cellulose acetate.

By calculating the terminal speed of the dropping container and knowing the deceleration that the instruments will safely withstand, one can determine the distance that must be consumed in stopping the container. Thus, if the terminal velocity of the falling container is 75 feet per second and the instrument will safely stand a deceleration of 6000 feet per second, it will take at least 5⅝ inches of travel to decelerate the container. Under such circumstances, the material that absorbs the impact should be somewhat thicker than this minimum, for example 7½ inches.

Having fixed the thickness of the impact pad, its cross-section and compressive strength will be selected to cause it to absorb the energy of impact during the desired amount of crushing. It is apparent that as the container increases in weight, the cross-section of the material crushed, the density of the material crushed, or both, must be increased, but that if these are increased out of proportion to the weight, the rate of deceleration will increase, perhaps beyond the limits that can be tolerated.

The above explanation of design has been given because finite limits can not be given for dimensions and density of the impact pad except in specific examples. When the weight or size or terminal velocity vary, the principles still apply but the dimensions and density must vary to fit the situation.

The droppable container can be of any shape. For example, it could be a sphere entirely surrounded by the impact pad. It is preferred, however, to make the container cylindrical in shape, make the impact pad in the shape of a nose portion and provide a drag or guiding fins to be sure that the container strikes on its nose.

It has also been found desirable in most instances to provide an air brake, not as a parachute, but merely to slow the device down as it leaves a high speed airplane, reduce the terminal velocity of fall to some extent and orient the device so that it will strike upon the nose.

Still further it has been found desirable to provide for the automatic detaching of both the nose and the brake when the device strikes the earth, and to provide means that will orient the device on the surface of the earth and erect an antenna so that efficient transmission of radio signals can be had.

Other details and advantages of this invention will be apparent from the following detailed description of the preferred embodiment thereof, as illustrated in the accompanying drawings.

In the drawings, Figure 1 is an elevational view of the preferred form of droppable container of this invention.

Figure 2 is an enlarged elevational view of a nose portion of the device of Figure 1, partly in section.

Figure 3 is a cross-section of the device taken on line 3—3 of Figure 2.

Figure 4 is a cross-section of the device as shown in Figure 2 taken on the line 4—4.

Figure 5 is a side elevational view showing the device after it has struck the earth, detached the nose and air brake sections, and erected the antenna.

Figure 6 is a top view of the container shown in Figure 5.

Figure 7 is a view partly broken away and partly in section showing one end of the air brake and the manner of attachment of the air brake to the body of the container.

Figure 8 is a view in side elevation of the other end of the air brake.

Figure 9 is a view in section of Figure 7 taken along line 9—9.

Figure 10 is a view similar to Figure 7 showing the condition of the air brake during flight.

Figure 11 is a view similar to Figure 7 showing the condition of the air brake just after impact.

Figure 12 is an elevational view of the upper end of the container and air brake showing this construction in somewhat more detail than it is shown in Figure 1.

Figure 13 is a top view of the construction shown in Figure 12, illustrating the manner in which the air brake is placed in operation.

Figure 14 is a top view of the container with the air brake removed and the radio antenna sectioned.

Figure 15 is a partial top view of a container, similar to Figure 14 except that it shows the antenna in an erected position.

Figure 16 is a detailed view partly in section and illustrating a part of the antenna erecting mechanism.

Figure 17 is a detailed view, partly in section, showing a part of the antenna and its erecting mechanism.

Figure 18 is a sectional view taken on line 18—18 of Figure 17.

Figure 19 is a sectional detailed view showing the antenna in one of its two possible erected positions.

Figure 20 is a sectional view taken on line 20—20 of Figure 18.

Figures 21 and 22 are sectional views taken on lines 21—21 and 22—22, respectively, of Figure 20.

As illustrated in Figure 1, the principles of this invention may advantageously be embodied in a cylindrical container 30, to the lower end of which is attached a crushable nose 31, and to the upper end of which is attached an air brake 32 and an antenna 33 (Figure 5). The contents of the cylindrical case 30 are of no specific importance to this invention and it is believed sufficient to indicate that they comprise a measuring instrument or instruments and a radio transmitter and the necessary power supply, i. e., batteries.

The measuring instrument or instruments and the radio transmitter are placed in operation by pulling the key 34, which can be seen in Figures 1, 12 and 14. This key is usually connected by a cord 35 to the air brake 32 so that when the air brake is disconnected from the container as will be hereinafter described, the key will be pulled and will thus place the radio transmitter and measuring instrument or instruments in operation.

Obviously, the key 34 may work either directly or through some time delay mechanism so as to place the equipment in operation either immediately or after a predetermined delay. This, however, is no part of the present invention and hence is not described in detail.

The radio transmitter in the cylinder 30 is connected to the antenna 33 and to the internal metal parts. The body of the cylinder and its ends are generally constructed of non-conducting plastic material and reinforced by metal end rings 36 and 37.

The first part of the droppable container to come into operation when the device is released from an airplane is the air brake 32. As shown in Figures 5, 12 and 13 particularly, this brake 32 consists of a central frame or rod 40 removably attached to the upper end of the cylinder 30 in a manner that will be later described. This central frame 40 carries at its upper end four pivotally mounted arms 41. Springs 42 are connected diagonally across between the upper ends of the opposite arms 41 so that they urge the arms to open away from the frame member 40 as shown in Figure 5. Between the arms 41 is a relatively strong fabric 43 that forms the face of the air brake when the arms are in their expanded position as shown in Figure 5.

Usually, the air brake will be wrapped with a piece of tape of some other retaining material to prevent its opening until it is ready for use at which time the tape or retaining ring is removed and the device is released from the aircraft. In order to prevent the air brake from opening too rapidly and thus subjecting the device to a severe deceleration, a cable 46 is tied to the lower end of each arm 41. This cable 46 passes within the frame 40 as indicated in Figures 7 and 10, passes around a slider 45, and then is fixed in some manner. As shown in Figure 7, this is accomplished by passing the cable through a small hole in the frame 40 and tying a knot in the cable to prevent its passage back through the hole. The slider 45 is mounted within frame 40 at the end of a piston rod 44 which fits within a cylinder 44a. The end of piston rod 44 within cylinder 44a constitutes a piston. The cylinder 44a is illustrated in Figure 8 and the interior thereof communicates with the atmosphere through an orifice 44b located at the end remote from the piston rod 44. In operation, the cylinder 44a is filled with a hydraulic fluid. According as the arms 41 swing to their open position they will, by means of cables 46, exert a force on slider 45 which will tend to move the piston rod 44 and piston into cylinder 44a. However, the hydraulic fluid in the cylinder 44a and orifice 44b will combine to produce a dashpot effect to slow the movement of arms 41 and thereby prevent the brake from opening too rapidly. Fins 46a are provided on the outside of frame 40 to give a measure of stability to the device during its flight through the air.

At its lower end (see Figures 7, 10 and 11), the brake 32 terminates in a sleeve 47 that fits over a sleeve 47a bolted to the top face 49 of the cylinder 30. The sleeve 47 is held in place on the brake 32 by having its other end bolted to frame 40. The sleeve 47a is provided with a central bore into which fits a drawbolt 48 which is held in position by a pin 50 extending through sleeve 47a and one end of drawbolt 48. The other end of drawbolt 48 has mounted thereon a cylinder 48a having a groove 48b therein. A spring 51 is mounted within sleeve 47 which biases the brake 32 away from container 30.

The groove 48b in drawbolt 48 corresponds to an aperture 52 in sleeve 47. A ball 52a lies in the aperture 52 and fits into groove 48b to prevent the brake 32 from being removed from the drawbolt 48. A latch 53 pivotally mounted as at 53a holds ball 52a in the groove 48b in one position (see Figures 10 and 11) and in another position permits the ball 52a to move out of groove 48b so that the brake can be disengaged from the drawbolt 48 by means of the spring 51 (see Figure 11). The latch 53 is held in the ball holding piston by means of a trigger 54 pivotally mounted as at 54a. A pin 54b projecting from the trigger 54 engages one end of latch 53 and prevents movement of the latch 53 with which it is so engaged. The trigger 54 is arranged with a flange 54c which does not extend throughout its length. The trigger 54 is held in its latch engaging position by means of a magnet 55. A sliding weight 56 is mounted in a cylinder 56a attached to the side of frame 40 by metal strips 55a. A spring 56b is attached between one end of the weight 56 and the cylinder 56a. On its other end, the weight 56 has pivotally mounted thereon an arm 57 which normally overlies the flange 54c of the trigger 54 (see Figure 7). The arm 57 is provided with an inset part 57a and is biased by means of spring 57b into tight contact with flange 54c. The weight 56 is provided with a projecting lug 58 which fits through a slot 58a in the cylinder 56a. Normally, the lug 58 is held at one end of slot 58a by a slide 59 mounted on the outside of cylinder 56a (see Figure 7). In this position the spring 56b is tensioned. A cord 59a is connected between the slide 59 and one of the brake arms 41.

In operation, the brake 32 is initially conditioned as shown in Figures 7, 8 and 9. When the assembly is dropped or released from an aircraft the arms 41 open as previously described. As the cord 59a is attached to one of the arms 41, the movement of the arm 41 will cause slide 59 to be pulled clear of slot 58a thereby permitting spring 56b to move weight 56 away from container 30. This results in arm 57 being moved with weight 56 until the inset part 57a engages the flange 54c on the trigger 54. The assembly is now conditioned for its flight through the air and is as illustrated in Figure 10. When the container strikes the earth or water or the like, the inertia of weight 56 will carry it forward in cylinder 56a against spring 56b. The movement of weight 56 results in arm 57 also being moved forward and thereby pivots trigger 54 away from magnet 55. This disengages pin 54b from latch 53 and permits the ball 52a to move into aperture 52 thereby releasing drawbolt 48. The spring 51 urges the brake 32 away from container 30 and with the aid of the shock of impact ejects the brake 32 away from the container 30. During the ejection the ball 52a is pushed into aperture 52. As the brake 32 is ejected, it pulls the cord 35 and the pin 34, thus starting the measuring instrument and the radio transmitter in operation, and at the same time, it pulls a cord 68 connected between brake 32 and another removable pin 68a and this controls the erection of the antenna as will be hereinafter described.

Before describing the erection of the antenna, the action of the nose of the device will first be described since this takes place during a time delay before the antenna is erected.

By reason of the brake 32, the device falls nose first and hence strikes the earth upon the nose 31 at a predetermined velocity.

The nose of the device illustrated in the drawings (Figure 2) is constructed of a number of layers 60 of an unoriented multi-cellular form of cellulose acetate, as described above. The particular material which it has been found advantageous to use has a density of 6–7 lb./cu. ft. and a compressive strength of about 197 lb./sq. in. The particular unit for which this nose was designed was 4¾ inches in diameter, 26½ inches in overall length and weighed 16 pounds. The nose itself was 7½ inches in length and was flat across the lower end, because that shape was found to improve the stability in falling.

The plastic portion of the nose, consisting of the layers 60, is mounted on a cup-shaped member 61 by means of three machine screws 62 passing through washers 63 imbedded in the material. The angular holes 64 shown in Figure 2 are for access to the heads of the screws 62 for the purpose of assembly. The cup-shaped member 61 is received on a stub shaft 65 extending downwardly from the bottom of the cylinder 30 and is held in place thereon by a collar 66 and a shearable pin 67 that passes through the collar and the stub shaft 65. The collar 66 is fixed rigidly to the cup-shaped member 61 and enough clearance is provided so that when the nose strikes the earth, the cup-shaped member 61 and the collar 66 will move upwardly for a distance sufficient to shear the pin 67. Thereafter the nose will be thrown from the body cylinder 30 by a spring 67a which surrounds the stub shaft 65 and presses against the cup-shaped member 61 on one end and against the cylinder 30 on the other end.

Inside of the cup-shaped member 61 are two leaf spring members 69 and 69a. Each of these spring members comprises a longer leaf and shorter leaf and both leaves are mounted together on one end of a U-shaped member 69b bolted to the bottom end of the cylinder 30. When the cup-shaped member 61 is in place, the springs 69 and 69a are coiled inside of it as shown in full lines in Figure 4. Once the nose has been thrown clear by the spring 67a, the springs 69 and 69a straighten out into the positions shown in dotted lines in Figure 4 and this causes the cylinder 30 to roll into a position where one or the other of the springs 69 and 69a is flat against the ground. This places the axis of the antenna system parallel to the ground as will appear, and makes it possible to erect the antenna into a vertical position.

The erection of the antenna will be explained by references to Figures 14 to 22, inclusive.

Referring first to Figure 14, when the device strikes the ground, the air brake is ejected from container 30 by the spring 52. This pulls the cord 68 which is connected between the brake 32 and the pin 68a, which is shown in Figures 14 and 16. The pin 68a passes through a hole in a block 70 mounted on the top plate 49 of the cylinder 30. It also passes through a rod 71 mounted in this block 70 so that when the pin 68a is removed, the rod 71 is free to move in the block 70. It is urged to move to the left as shown in Figures 14 and 16 by spring 72.

In moving to the left, the rod 71 releases a small timing mechanism 73, such as an ordinary camera timer. The forked end 74 which previously held the camera timer in inoperative position is shown in Figure 15. The knurled knob on the camera timer 73 adjusts the timing and the dashpot shown below the base plate 49 in Figure 16 acts as the timing element. As the timer operates the knurled knob descends and in so doing it lowers the left hand end of a lever 76 (Figure 16) which is pivotally mounted on the supporting frame 77 of the antenna erecting mechanism. This supporting frame is in turn mounted on the end plate 49.

As the lever 76 is rotated, it releases a lever 78 held in a notch in the upper side of the lever 76 and this sets in operation the antenna erecting mechanism. A time delay occasioned by the use of the camera timer 73 has given the cylinder time to orient itself so that it now lays on one side or the other in such a position that the axis about which the antenna is to rotate will be substantially parallel to the ground.

As the lever 78 is freed, it pivots about a pin 79 (Figures 15 and 20) by which it is mounted on the antenna frame 77. This releases two spring-pressed pins, 80 and 81 as shown in Figure 20, the springs 82 and 83 that do the pressing lying inside of the frame 77 and pressing against shoulders 84 and 85 fixed to the pins. One of the pins, 81 as shown in Figure 20, moves to the left as shown in Figure 20 under the influence of the spring. The other pin can not move, however, because its shoulder 84 is blocked by a lug 86, as illustrated in Figure 21. This lug slides in a guideway 88 cut in the body 77 and is operated entirely by gravity. Thus, depending upon which side the cylinder is resting, the lug 86 blocks the movement of one or the other of the pins 80 and 81.

By reference to Figure 17, it will be seen that the pins 80 and 81 anchor the lower ends of springs 90 and 91, respectively. The upper ends of these springs are connected to opposite sides of a rotatable antenna system 92 on the upper end of which the antenna 93 is mounted. Since the springs are under tension, the release of one spring causes the antenna to rotate in the opposite direction. Thus, as either pin 80 or 81 is moved to the left, as shown in Figure 20, the corresponding spring 90 or 91 is released from the corresponding slot 96 or 97, respectively. The result as shown in Figure 20 is the erection of the antenna so that it stands upwardly at right angles to the ground.

The rotatable antenna supporting member 92 is mounted on a pin 100 that extends through its lower end and through a fork formed in the antenna supporting frame 77. A removable pin 102, shown in Figure 12, and extending through both the antenna supporting members 92 and the antenna supporting frame 77 locks the antenna against erection when the device is to be dropped into the water. In that case, the device floats in an upright position and it is not desirable to move the antenna to either side.

The device illustrated in the drawings and described above should be understood to be but a single, illustrative example of the principles of this invention. It is to be understood that numerous modifications and minor improvements may be made in the construction illustrated without departing from the spirit and scope of the invention as defined in the appended claims. In fact, a number of details and parts have been deliberately omitted from the drawings because they are not essential to an illustration of the principles of this invention and their inclusion would, it is believed, unduly complicate this description.

What is claimed is:

1. A container suitable for dropping from an aircraft comprising a body member having a storage compartment adapted to receive an instrument subject to being damaged by shock, impact, and deceleration beyond a predetermined amount, and a nose attached to one end of said body member comprising a non-resilient, crushable material having therein multiple adjacent air-containing cells, which material upon impact with the earth absorbs and dissipates the energy of impact by being crushed to a condition of permanent deformation without storing the energy of impact, said nose having a length sufficient to decelerate the container safely from its terminal velocity to zero at a deceleration less than said predetermined amount.

2. A container as defined in claim 1 wherein said material is porous.

3. A container as defined in claim 1 wherein said material is of an unoriented, multi-cellular composition.

4. A container as defined in claim 3 wherein said unoriented multi-cellular composition is cellulose acetate.

5. A container as defined in claim 1 wherein a means is provided on the other end of said member to orient said container so that it will strike the earth on said nose.

6. A container as defined in claim 1 wherein an airbrake means is provided on the other end of said member to reduce terminal velocity of the fall and orient said container so that it will strike the earth upon said nose.

7. A container as defined in claim 6 wherein automatic means are provided to eject the nose from the container, and automatic means are provided to eject the airbrake means from the container, both of said means being operable after said container has struck the earth.

8. A container as defined in claim 6 wherein automatic means are provided to orient said container in one of two positions after said nose has been ejected.

9. A container as defined in claim 1 wherein means are provided to eject automatically said nose from the container after it has struck the earth.

10. A container suitable for dropping from an aircraft as defined in claim 1 that further comprises means for orienting said container in one of two horizontal and stationary positions after it has struck the earth.

11. A container suitable for dropping from an aircraft or the like that comprises a body member having a storage compartment, a nose located at one end of said member, said nose comprising a substantially non-resilient, crushable material to absorb the power of impact when said container strikes the earth, airbrake means on the other end of said member to reduce the terminal velocity of fall and orient said container so that it will strike the earth upon said nose, automatic means for ejecting said nose and said airbrake means from the container, said automatic means being operable after said container has struck the earth, further automatic means for orienting said container in one of two positions after said nose has been ejected, a radio transmitter located within said body member, an antenna attached to said body member externally thereof, means for erecting said antenna to an upright position after said container has struck the earth and assumed one of the said two positions, and means responsive to the ejecting of said airbrake means for conditioning said radio transmitter for operation.

12. A container as defined in claim 11 wherein means responsive to the ejection of said airbrake means are provided to condition said means for erecting said antenna for operation.

References Cited in the file of this patent

UNITED STATES PATENTS

| | | |
|---|---|---|
| 2,124,876 | Driggs | July 26, 1938 |
| 2,408,246 | Walter | Sept. 24, 1946 |
| 2,454,616 | Schultz | Nov. 23, 1948 |
| 2,457,205 | Campbell | Dec. 28, 1948 |
| 2,473,050 | Camp | June 14, 1949 |
| 2,555,352 | Lowell | June 5, 1951 |
| 2,644,655 | Kitch | July 7, 1953 |

FOREIGN PATENTS

| | | |
|---|---|---|
| 197,803 | Great Britain | May 24, 1923 |
| 843,985 | France | Apr. 11, 1939 |